(12) United States Patent
Kim

(10) Patent No.: US 9,664,787 B2
(45) Date of Patent: May 30, 2017

(54) LANE ESTIMATION APPARATUS AND METHOD

(71) Applicant: MANDO CORPORATION, Pyeongtaek-si, Gyeonggi-do (KR)

(72) Inventor: Hyun-Wook Kim, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 516 days.

(21) Appl. No.: 14/251,042

(22) Filed: Apr. 11, 2014

(65) Prior Publication Data

US 2014/0306844 A1 Oct. 16, 2014

(30) Foreign Application Priority Data

Apr. 11, 2013 (KR) .................. 10-2013-0039681

(51) Int. Cl.
*G01S 1/00* (2006.01)
*G01S 13/86* (2006.01)
*G01S 13/93* (2006.01)

(52) U.S. Cl.
CPC ........... *G01S 13/867* (2013.01); *G01S 13/931* (2013.01)

(58) Field of Classification Search
CPC .............................. G01S 13/867; G01S 13/931
USPC ........................................................ 342/385
See application file for complete search history.

(56) References Cited

U.S. PATENT DOCUMENTS 8,830,141 B2 *  9/2014 Seder ................ B32B 17/10036
                                              345/7
9,223,311 B2 * 12/2015 Matsuno ................ G08G 1/167
9,403,436 B1 *  8/2016 Yamada ................ B60K 35/00
2006/0015227 A1 *  1/2006 Knoll ................ B62D 15/0215
                                              701/41
2009/0088966 A1 *  4/2009 Yokoyama ........... B62D 15/025
                                              701/533

(Continued)

FOREIGN PATENT DOCUMENTS

CN       101911122 A     12/2010
CN       102275558 A     12/2011

(Continued)

OTHER PUBLICATIONS

Chinese Office Action dated Feb. 4, 2016 issued in Chinese Patent Application No. 201410208141.2.

(Continued)

*Primary Examiner* — Frank J McGue
(74) *Attorney, Agent, or Firm* — McDermott Will & Emery LLP

(57) ABSTRACT

Disclosed herein are a lane estimation apparatus and method. The lane estimation apparatus includes a camera unit which captures an image in front of a vehicle, a radar unit which senses a plurality of stationary objects in front of the vehicle, and a lane estimation unit which detects a lane through the image captured by the camera unit, generates an imaginary lane joining a plurality of stationary objects next to a road among the stationary objects sensed by the radar unit, determines whether the generated imaginary lane is valid based on a distance between the detected lane and the generated imaginary lane, generates, when the imaginary lane is valid according to the determined result, a final lane based on the detected lane and the imaginary lane, and recognizes the generated final lane as a driving lane of the vehicle.

8 Claims, 3 Drawing Sheets

(56) References Cited

U.S. PATENT DOCUMENTS

| | | | | |
|---|---|---|---|---|
| 2011/0231095 A1* | 9/2011 | Nakada | ............... | B60W 30/12 |
| | | | | 701/301 |
| 2012/0140039 A1* | 6/2012 | Ota | ............... | B60W 30/12 |
| | | | | 348/46 |
| 2014/0156158 A1* | 6/2014 | Matsuno | ............... | G08G 1/167 |
| | | | | 701/70 |

FOREIGN PATENT DOCUMENTS

| | | | |
|---|---|---|---|
| DE | 102006040334 A1 | | 3/2008 |
| DE | 102010032063 A1 | | 5/2011 |
| JP | H09167239 A | | 6/1997 |
| JP | 2011-233151 A | | 11/2011 |
| JP | 2012264521 | * | 12/2012 |
| JP | 2013184563 A | * | 9/2013 |
| KR | 10-1999-0084339 A | | 12/1999 |
| KR | 20110066571 A | | 6/2011 |
| KR | 10-2013-0011825 A | | 1/2013 |

OTHER PUBLICATIONS

Korean Office Action dated Mar. 9, 2017 issued in Korean Patent Application No. 10-2013-0039681 (English translation).

* cited by examiner

LANE ESTIMATION APPARATUS AND METHOD

CROSS-REFERENCE TO RELATED APPLICATION

This application claims the benefit of Korean Patent Application No. 2013-0039681, filed on Apr. 11, 2013 in the Korean Intellectual Property Office, the disclosure of which is incorporated herein by reference.

BACKGROUND

1. Field

Embodiments of the present invention relate to a lane estimation apparatus and method, capable of more accurately estimating a driving lane.

2. Description of the Related Art

In general, an LKAS (Lane Keeping Assist System) is a system which generates assistive steering torque when a vehicle deviates from a lane during driving thereof using lane information by a camera so as to assist driving convenience.

However, the camera may cause an unrecognized or misrecognized state of the lane due to direct sunlight (backlight), dust on a road, etc., and have a limited lane keeping assist function due to a delay of time taken to recognize the lane.

In addition, the LKAS operates sensitively to a change between a short-distance lane and a long-distance lane. Accordingly, since the LKAS takes a long time to recognize the lane, the LKAS has limited performance.

SUMMARY

Therefore, it is an aspect of the present invention to provide a lane estimation apparatus and method, which improve ability and reactivity to recognize a lane by means of a camera capturing the front of a vehicle and radar sensing stationary objects next to a driving path in performing lane keeping assist control.

Additional aspects of the invention will be set forth in part in the description which follows and, in part, will be obvious from the description, or may be learned by practice of the invention.

In accordance with one aspect of the present invention, a lane estimation apparatus includes a camera unit which captures an image in front of a vehicle, a radar unit which senses a plurality of stationary objects in front of the vehicle, and a lane estimation unit which detects a lane through the image captured by the camera unit, generates an imaginary lane joining a plurality of stationary objects next to a road among the stationary objects sensed by the radar unit, determines whether the generated imaginary lane is valid based on a distance between the detected lane and the generated imaginary lane, generates, when the imaginary lane is valid according to the determined result, a final lane based on the detected lane and the imaginary lane, and recognizes the generated final lane as a driving lane of the vehicle.

The lane estimation unit may include a lane detection unit which detects a lane through the image captured by the camera unit, an imaginary lane generation unit which generates an imaginary lane joining the plural stationary objects next to the road among the stationary objects sensed by the radar unit, an imaginary lane validity determination unit which compares similarity between the generated imaginary lane and the detected lane with regard to at least one of lane areas divided into a short-distance area and a long-distance area based on a distance between the vehicle and each of the plural stationary objects, and determines whether the generated imaginary lane is valid according to the compared result, a final lane generation unit which generates, when the imaginary lane is valid according to the determined result, a final lane based on the detected lane and the imaginary lane, and a lane recognition unit which recognizes the generated final lane as a driving lane of the vehicle.

The imaginary lane validity determination unit may determine whether the imaginary lane is valid using similarity between the imaginary lane and the detected lane with regard to the short-distance area.

The imaginary lane validity determination unit may determine that the two lanes are similar to each other when a lateral distance error between the two lanes in the short-distance area is less than a reference error, so that the imaginary lane is determined to be valid.

When the imaginary lane is valid in the short-distance area, the final lane generation unit may calculate a lateral distance error between the detected lane and the imaginary lane in the long-distance area and generate the final lane when the calculated error is within a preset range.

The final lane generation unit may select the detected lane with regard to the short-distance area and the imaginary lane with regard to the long-distance area, and generate the final lane in combination with the selected lanes.

In accordance with another aspect of the present invention, a lane estimation method includes detecting a lane through an image captured by a camera unit which captures the image in front of a vehicle, generating an imaginary lane joining a plurality of stationary objects next to a road among a plurality of stationary objects sensed by a radar unit which senses the stationary objects in front of the vehicle, comparing similarity between the generated imaginary lane and the detected lane with regard to at least one of lane areas divided into a short-distance area and a long-distance area based on a distance between the vehicle and each of the plural stationary objects, determining whether the generated imaginary lane is valid according to the compared result, generating, when the imaginary lane is valid according to the determined result, a final lane based on the detected lane and the imaginary lane, and recognizing the generated final lane as a driving lane of the vehicle.

The lane estimation method may include determining that the two lanes are determined to be similar to each other when a lateral distance error between the two lanes in the short-distance area of the lane areas is less than a reference error and a lateral distance error between the two lanes in the long-distance area is within a preset range, so that the imaginary lane is determined to be valid.

The lane estimation method may include selecting the detected lane with regard to the short-distance area and the imaginary lane with regard to the long-distance area, and generating the final lane in combination with the selected lanes.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
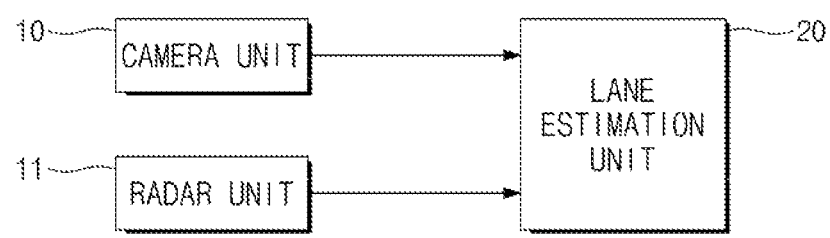
FIG. 1 is a control block diagram illustrating a lane estimation apparatus according to an embodiment of the present invention.
Figure 2:
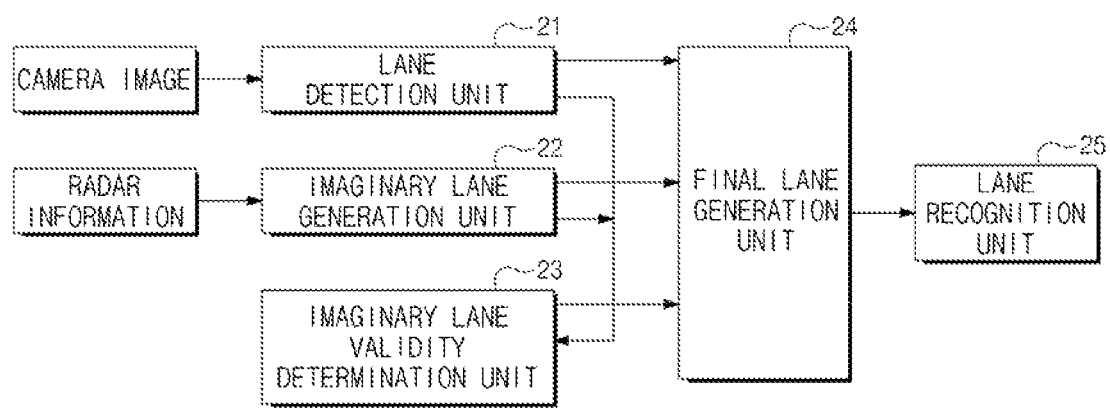
FIG. 2 is a block diagram illustrating a configuration of a lane estimation unit of the lane estimation apparatus according to the embodiment of the present invention.

Reference will now be made in detail to the embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, the width, length, thickness, or the like of the component may be exaggerated, omitted, or schematically illustrated for convenience of description and clarity. Throughout the disclosure, like reference numerals refer to like parts throughout the various figures and embodiments of the present invention.

As used herein, the term "and/or" includes any and all combinations of one or more of the associated listed items. In addition, it will be understood that when an element is referred to as being "coupled/connected" to another element, it can be directly coupled or connected to the other element or intervening elements may also be present. As used in the specification and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a control block diagram illustrating a lane estimation apparatus according to an embodiment of the present invention.

Referring to FIG. 1, a lane estimation apparatus may include a camera unit 10, a radar unit 11, and a lane estimation unit 20.

The camera unit 10 captures a road image in front of a vehicle. The camera unit 10 may include a CCD (Charge Coupled Device) or CMOS (Complementary Metal Oxide Semiconductor) image sensor. In addition, the camera unit 10 may include an operational device which processes and calculates signals received from the CCD or CMOS image sensor.

The camera unit 10 is mounted to the front of the vehicle such that an optical axis direction thereof coincides with a forward direction of the vehicle.

The camera unit 10 may have a wide imaging range in the left and right directions and sufficiently capture the road on which the vehicle is driven. The camera unit 10 captures the road in front of the vehicle by the image sensor and outputs the captured image to the operational device.

The radar unit 11 senses an object on the road in front of the vehicle. The radar unit 11 senses stationary objects arranged along the road in front of the vehicle. For example, the stationary objects may include telephone poles, trees, guardrails, walls, etc. placed along the road.

The radar unit 11 is a device which projects micro-sized radar signals such as electromagnetic waves to an object and receives radar signals reflected from the object so as to identify a distance and a direction between the object and the radar unit.

The radar unit 11 may be mounted at a predetermined height in front of the vehicle. The radar unit 11 transmits radar signals toward the front of the vehicle while scanning the radar signals in the left and right directions and receives the reflected radar signals.

A round-trip distance between the radar unit 11 and an object may be obtained by a time for which the radar unit 11 transmits radar signals and receives the radar signals reflected from the object.

That is, the distance between the radar unit 11 and an object may be calculated by measuring a time for which the radar unit 11 transmits radar signals and detects the radar signals reflected from the object.

The lane estimation unit 20 detects a lane through an image captured by the camera unit 10, generates an imaginary lane joining a plurality of stationary objects next to a road among stationary objects sensed by the radar unit 11, compares similarity between the generated imaginary lane and a lane detected with regard to a short-distance area among lane areas divided into the short-distance area and a long-distance area based on a distance between a vehicle and each of the plural stationary objects, determines whether the imaginary lane is valid according to the compared result, selects, when the imaginary lane is valid according to the determined result, the detected lane with regard to the short-distance area and the imaginary lane with regard to the long-distance area, generates a final lane in combination with the selected lanes, and recognizes the generated final lane as a driving lane of the vehicle.

As described above, the final lane is generated by means of the lane detected through the image captured by the camera unit 10 and the imaginary lane generated using the stationary objects next to the road sensed by the radar unit 11, and the generated final lane is recognized as the driving lane. Therefore, it may be possible to improve reactivity and accuracy of lane recognition compared to a lane estimation method using only a camera.

The lane estimation unit 20 may include a lane detection unit 21, an imaginary lane generation unit 22, an imaginary lane validity determination unit 23, a final lane generation unit 24, and a lane recognition unit 25.

The lane detection unit 21 is a unit to detect a lane through an image captured by the camera unit 10, and extracts a lane defined by a bright portion on the road from the image captured by the camera unit using a filtering algorithm. The lane detection unit 21 may utilize an edge filter or a lane emphasis filter in order to detect a lane. The edge filter detects a portion forming a boundary from the image using a brightness difference for each pixel in an X direction and a Y direction on the image coordinates. The lane emphasis filter emphasizes a lane such that a bright lane is more remarkable using an average value of brightness compared to ambient brightness.

The imaginary lane generation unit 22 generates an imaginary lane based on stationary objects on the front road sensed by the radar unit 11. The imaginary lane may include a line joining the stationary objects.

Figure 3:
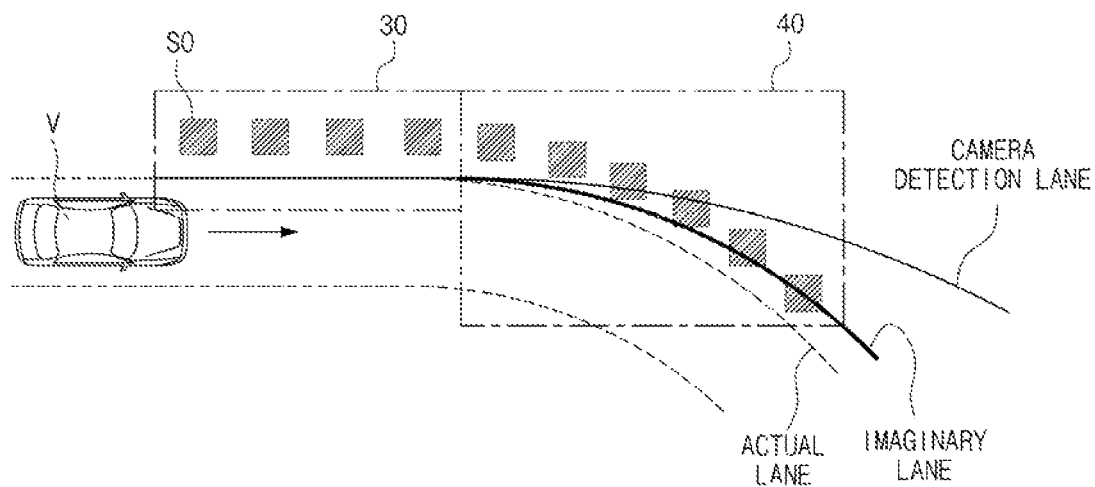
FIG. 3 is a view for explanation of a lane detected using a camera unit and an imaginary lane generated using stationary objects sensed by a radar unit in the lane estimation apparatus according to the embodiment of the present invention.

FIG. 3 is a view for explanation of a lane detected using the camera unit and an imaginary lane generated using the stationary objects sensed by the radar unit in the lane estimation apparatus according to the embodiment of the present invention.

Referring to FIG. 3, a camera detection lane is a lane detected by the lane detection unit 21 and an imaginary lane is a lane generated by the imaginary lane generation unit 22.

Lane areas 30 and 40 are divided into a short-distance area and a long-distance area based on a distance between a vehicle and each of a plurality of stationary objects.

With regard to the short-distance area 30, the camera detection lane is nearly equal to an actual lane and is nearly similar to the imaginary lane.

However, with regard to the long-distance area 40, the camera detection lane makes a large difference from the actual lane. Rather, the imaginary lane has a less difference than a difference between the camera detection lane and the actual lane.

This difference is caused because the imaginary lane is generated using the stationary objects sensed by the radar unit 11 having excellent sensing speed and performance relative to the long distance.

However, since the imaginary lane is merely a line joining the stationary objects next to the road, there is a need to verify whether the imaginary lane is valid in order to determine a valid value used to estimate a driving lane of the vehicle.

Referring to FIG. 1 again, the imaginary lane validity determination unit 23 compares similarity between the generated imaginary lane and a lane detected with regard to at least one, for example the short-distance area 30, of the lane areas divided into the short-distance area 30 and/or the long-distance area 40, based on a distance between the vehicle and each of the plural stationary objects, and determines whether the generated imaginary lane is valid according to the compared result.

For example, the imaginary lane validity determination unit 23 determines that the imaginary lane is valid when the imaginary lane has a lane form similar to the detected lane using similarity between the generated imaginary lane and the detected lane with regard to the short-distance area 30. In this case, similarity to the lanes may be determined by a lateral distance error. Two lanes may be determined to be not similar when the lateral distance error is more than a reference error, and two lanes may be determined to be similar when the lateral distance error is less than a reference error.

When the imaginary lane is valid as a result determined by the imaginary lane validity determination unit 23, the final lane generation unit 24 selects the detected lane with regard to the short-distance area 30 and the imaginary lane with regard to the long-distance area 40, and generates a final lane in combination with the selected lanes.

In more detail, when the imaginary lane is similar to the detected lane in the short-distance area 30 and is determined to be valid, the final lane generation unit 24 determines whether a lateral difference between the imaginary lane and a lane detected with regard to the long-distance area 40 is within a preset range. If the lateral difference between the imaginary lane and the detected lane in the long-distance area 40 is within a preset range, the final lane generation unit 24 selects the detected lane with regard to the short-distance area 30 and the imaginary lane with regard to the long-distance area 40, and generates a final lane in combination with the selected lanes.

Figure 4:
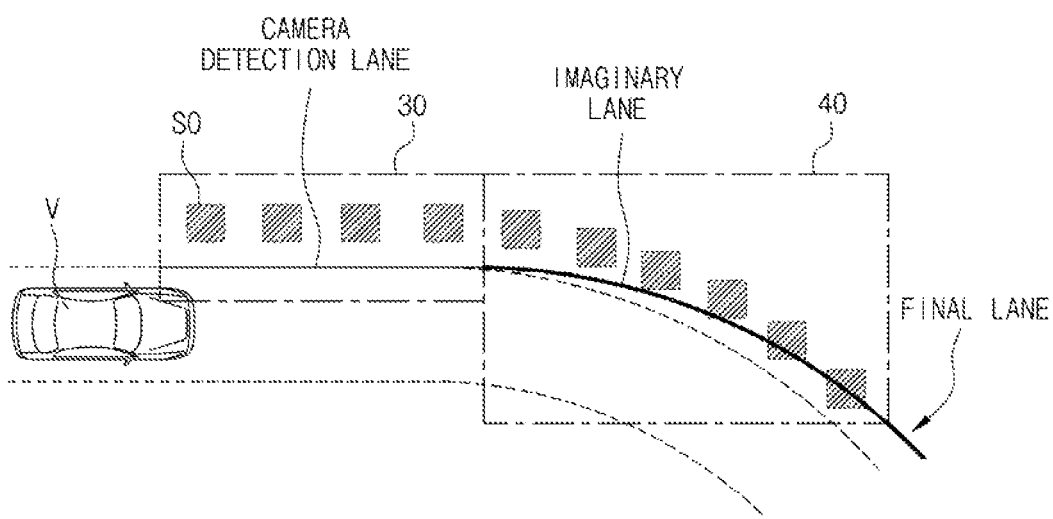
FIG. 4 is a view for explanation of a final lane generated in combination with a lane detected using the camera unit with regard to a short-distance area and an imaginary lane generated using stationary objects sensed by the radar unit with regard to a long-distance area in the lane estimation apparatus according to the embodiment of the present invention.

FIG. 4 is a view for explanation of a new final lane generated in combination with a lane detected using the camera unit and an imaginary lane generated using stationary objects sensed by the radar unit in the lane estimation apparatus according to the embodiment of the present invention.

Referring to FIG. 4, the final lane is a lane in combination with a detected lane with regard to the short-distance area 30 and an imaginary lane with regard to the long-distance area 40.

Referring to FIG. 1 again, the lane recognition unit 25 recognizes the lane generated by the final lane generation unit 24 as a driving lane.

Subsequently, lane keeping control is performed based on the recognized driving lane.

Figure 5:
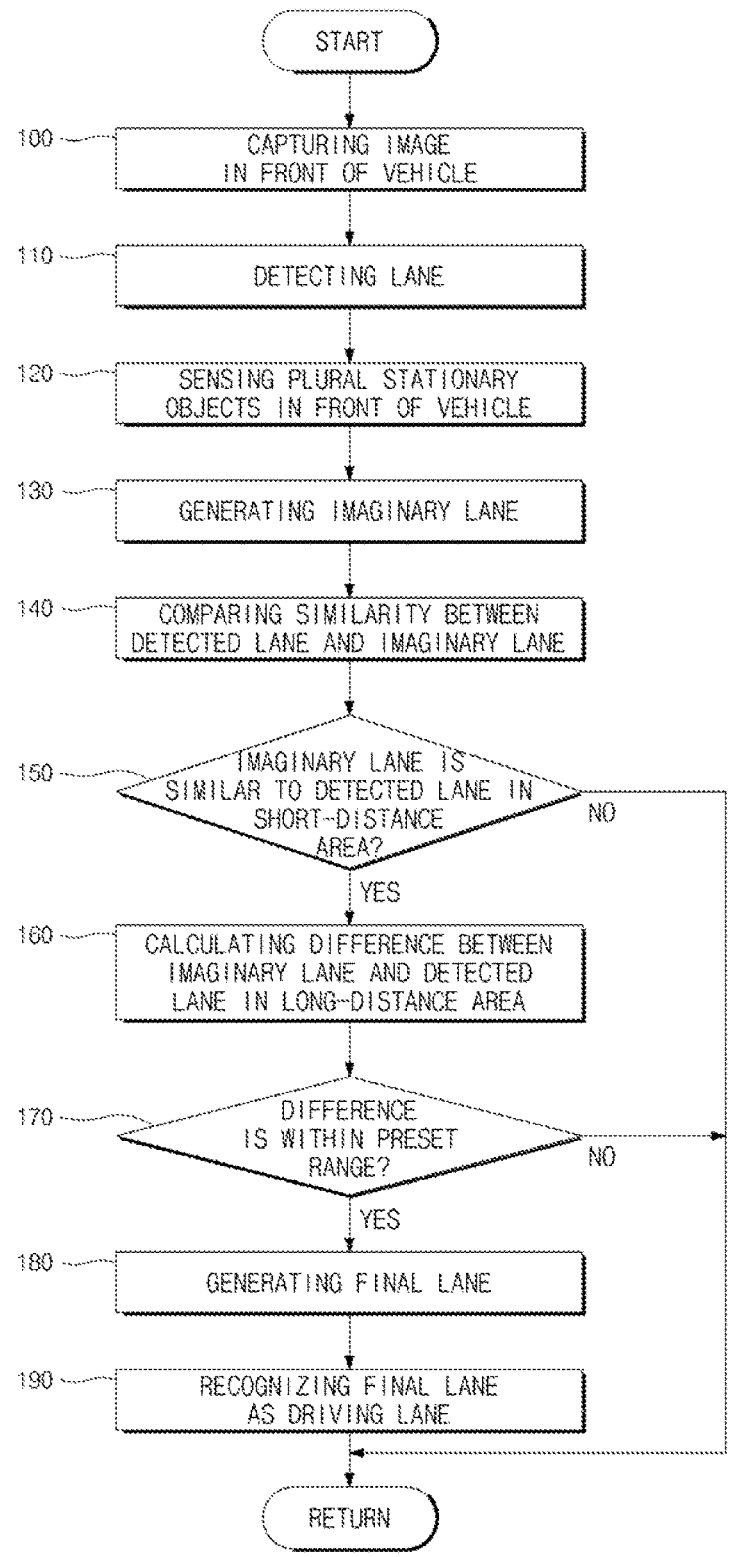
FIG. 5 is a control flowchart illustrating a lane estimation method according to an embodiment of the present invention.

FIG. 5 is a control flowchart illustrating a lane estimation method according to an embodiment of the present invention.

Referring to FIG. 5, the lane estimation unit 20 first captures an image in front of a vehicle using the camera unit 10 (operation mode 100).

After the image in front of the vehicle is captured, the lane estimation unit 20 analyses the image in front of the vehicle captured by the camera unit 10 so as to detect a lane (operation mode 110).

After the lane is detected, the lane estimation unit 20 senses a plurality of stationary objects next to a road in front of the vehicle using the radar unit 11 (operation mode 120). In this case, the lane estimation unit 20 may sense the plural stationary objects next to the road by combination of the image in front of the vehicle captured by the camera unit 10 and stationary objects in front of the vehicle sensed by the radar unit 11.

After the plural stationary objects are sensed, the lane estimation unit 20 generates an imaginary lane based on a line joining the sensed plural stationary objects (operation mode 130).

After the imaginary lane is generated, the lane estimation unit 20 compares similarity between the lane detected at operation mode 110 and the imaginary lane generated at operation mode 130 (operation mode 140). In this case, the lane estimation unit 20 compares a lateral distance between the detected lane and the imaginary lane.

It is determined whether the imaginary lane is similar to the detected lane in the short-distance area 30 using the compared result at operation mode 140. In this case, when a lateral distance error between the detected lane and the imaginary lane is less than a reference error, the lane estimation unit 20 determines that the two lanes are similar to each other (operation mode 150).

If it is determined that the imaginary lane is similar to the detected lane in the short-distance area according to the determined result at operation mode 150, the imaginary lane is determined to be valid. Consequently, the lane estimation unit 20 calculates a difference (for example, a lateral distance error) between the imaginary lane and the detected lane in the long-distance area 40 (operation mode 160), and determines whether the calculated difference is within a preset range (operation mode 170).

When the difference between the imaginary lane and the detected lane in the long-distance area 40 is within a preset range according to the determined result at operation mode 170, the lane estimation unit 20 selects the detected lane with regard to the short-distance area 30 and the imaginary lane with regard to the long-distance area 40, and generates a final lane in combination with the selected lanes (operation mode 180).

Subsequently, the lane estimation unit 20 recognizes the final lane generated at operation mode 180 as a driving lane (operation mode 190).

Thereinafter, lane keeping control such as lane deviation prevention control is performed based on the recognized driving lane.

As is apparent from the above description, the embodiments of the present invention estimate a driving lane by means of a lane detected via an image captured by a camera and an imaginary lane generated using stationary objects next to a road sensed by radar in performing lane keeping assist control. Consequently, it may be possible to improve reactivity and accuracy of lane recognition compared to a lane estimation method using only a camera.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lane estimation apparatus comprising:
    a camera unit which captures an image in front of a vehicle;
    a radar unit which senses a plurality of stationary objects in front of the vehicle;
    a lane estimation unit which detects a lane through the image captured by the camera unit, generates an imaginary lane joining a plurality of stationary objects next to a road among the stationary objects sensed by the radar unit, determines whether the generated imaginary lane is valid based on a distance between the detected lane and the generated imaginary lane, generates, when the imaginary lane is valid according to the determined result, a final lane based on the detected lane and the imaginary lane, and recognizes the generated final lane as a driving lane of the vehicle; and
    a lane detection unit which detects a lane through the image captured by the camera unit;
    an imaginary lane generation unit which generates an imaginary lane joining the plural stationary objects next to the road among the stationary objects sensed by the radar unit;
    an imaginary lane validity determination unit which compares similarity between the generated imaginary lane and the detected lane with regard to at least one of lane areas divided into a short-distance area and a long-distance area based on a distance between the vehicle and each of the plural stationary objects, and determines whether the generated imaginary lane is valid according to the compared result;
    a final lane generation unit which generates, when the imaginary lane is valid according to the determined result, a final lane based on the detected lane and the imaginary lane; and
    a lane recognition unit which recognizes the generated final lane as a driving lane of the vehicle.

2. The lane estimation apparatus according to claim 1, wherein the imaginary lane validity determination unit determines whether the imaginary lane is valid using similarity between the imaginary lane and the detected lane with regard to the short-distance area.

3. The lane estimation apparatus according to claim 2, wherein the imaginary lane validity determination unit determines that the two lanes are similar to each other when a lateral distance error between the two lanes in the short-distance area is less than a reference error, so that the imaginary lane is determined to be valid.

4. The lane estimation apparatus according to claim 1, wherein when the imaginary lane is valid in the short-distance area, the final lane generation unit calculates a lateral distance error between the detected lane and the imaginary lane in the long-distance area and generates the final lane when the calculated error is within a preset range.

5. The lane estimation apparatus according to claim 1, wherein the final lane generation unit selects the detected lane with regard to the short-distance area and the imaginary lane with regard to the long-distance area, and generates the final lane in combination with the selected lanes.

6. A lane estimation method comprising:
    detecting a lane through an image captured by a camera unit which captures the image in front of a vehicle;
    generating an imaginary lane joining a plurality of stationary objects next to a road among a plurality of stationary objects sensed by a radar unit which senses the stationary objects in front of the vehicle;
    comparing similarity between the generated imaginary lane and the detected lane with regard to at least one of lane areas divided into a short-distance area and a long-distance area based on a distance between the vehicle and each of the plural stationary objects;
    determining whether the generated imaginary lane is valid according to the compared result;
    generating, when the imaginary lane is valid according to the determined result, a final lane based on the detected lane and the imaginary lane; and
    recognizing the generated final lane as a driving lane of the vehicle.

7. The lane estimation method according to claim 6, comprising determining that the two lanes are determined to be similar to each other when a lateral distance error between the two lanes in the short-distance area of the lane areas is less than a reference error and a lateral distance error between the two lanes in the long-distance area is within a preset range, so that the imaginary lane is determined to be valid.

8. The lane estimation method according to claim 6, comprising selecting the detected lane with regard to the short-distance area and the imaginary lane with regard to the long-distance area, and generating the final lane in combination with the selected lanes.

* * * * *